June 20, 1967  R. R. STEINGAS ETAL  3,326,605
HARVESTER DUMP RECEPTACLE CONSTRUCTION
Filed July 1, 1965  2 Sheets-Sheet 1
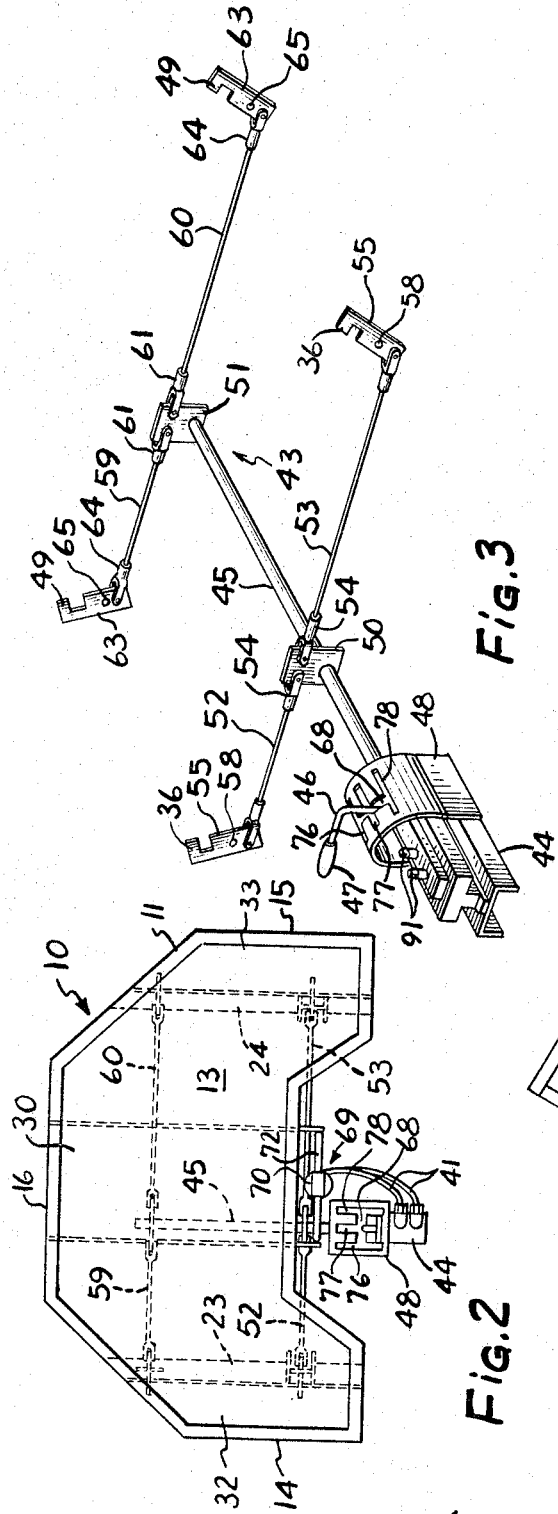
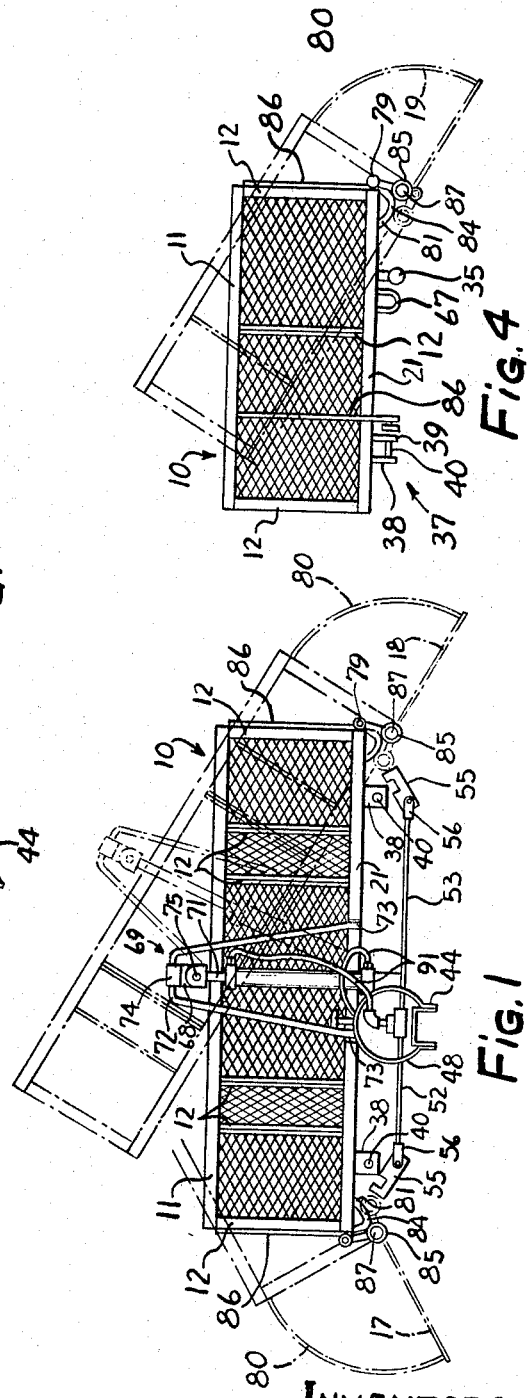
INVENTORS
RICHARD R. STEINGAS
HAROLD G. MEITL
by: John J. Kowalik
ATTY.

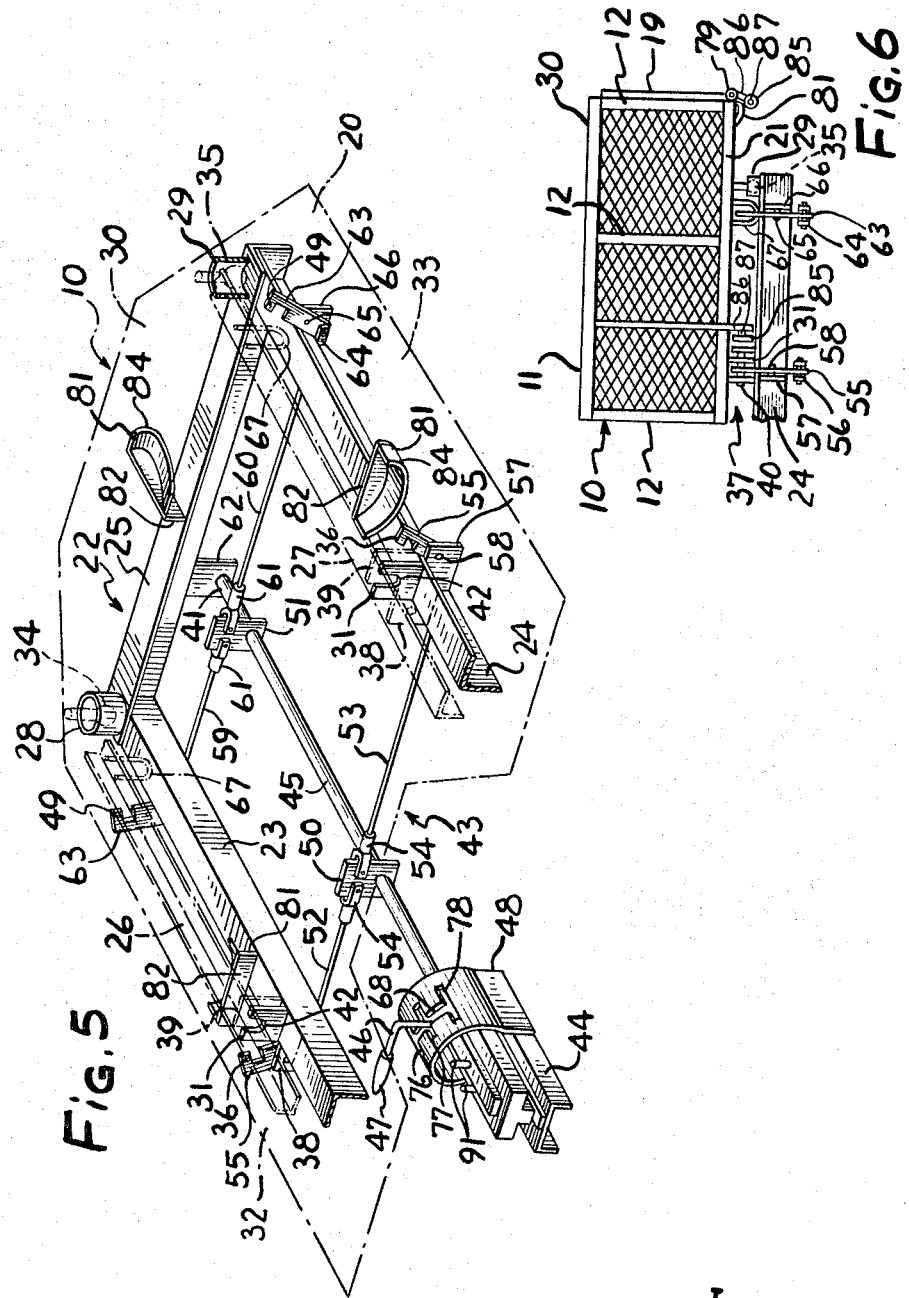

United States Patent Office

3,326,605
Patented June 20, 1967

3,326,605
HARVESTER DUMP RECEPTACLE
CONSTRUCTION
Richard R. Steingas, Naperville, and Harold G. Meitl, Clarendon Hills, Ill., assignors to International Harvester Company, a corporation of Delaware
Filed July 1, 1965, Ser. No. 468,689
8 Claims. (Cl. 298—17.7)

This invention relates to dump receptacles and the like. Particularly it relates to a dump basket adapted to collect and transfer fruit while harvesting within an orchard.

A conventional mobile fruit picker is a relatively large device which is adapted to work within an orchard in which the nature of conventional congestion due to proximity of vegetation is such that maneuverability thereof within the orchard is rather limited and difficult. A conventional mobile fruit picker embodies a receptacle in which the fruit can be collected during harvesting, and, when such receptacle becomes filled, it can be relieved of its load at a collection station, which may be a mobile collection trailer. To facilitate removal of fruit from the picker receptacle, the picker may be provided with means for dumping harvested fruit at a collection station.

Although fruit pickers are mobile, the nature of their construction is such that inefficiencies result when it is required that special maneuvering be undertaken to facilitate voiding their receptacles. It is therefore desirable to provide in a fruit picker a construction which facilitates dumping of receptacle contents without the requirement of vehicular maneuvering to permit evacuation.

Because of the physical characteristics of an orchard, a fruit receptacle should be rigidly connected to the picker body and not of trailing structure. Additionally, inasmuch as the receptacle will be required to carry heavy loads, its supporting means should be of a construction adapted to minimize picker skidding.

In accordance with the instant invention, and as an object thereof, there is provided an improved receptacle construction adapted for use in fruit harvesting and the like, having novel means for translocation of the harvested fruit from said receptacle to a collection station.

It is an additional object of the instant invention to provide a dump receptacle construction and the like adapted for mounting on a mobile fruit harvester and having dump means for evacuating receptacle contents by tilting the receptacle relative to the harvester body at a plurality of angles in a plurality of planes.

A further object of the instant invention is the provision of a dump receptacle having a plurality of dump gates on the sides of the receptacle and having means for selectively tilting the dump receptacle toward each gated side to dump the contents of said receptacle.

It is another object of the instant invention to provide a dump receptacle adapted for use on a fruit harvester and the like having means for selectively rocking said receptacle about a plurality of angularly disposed axes, whereby the receptacle is tiltable to gravity-void the receptacle in a plurality of directions.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a rear end elevational view of one embodiment of the instant invention, the receptacle being shown in phantom lines in a pair of alternate side dumping positions.

FIG. 2 is a top plan view of said embodiment, portions disposed below the floor of said receptacle being shown in dotted lines.

FIG. 3 is a perspective view of the dump direction control mechanism of said embodiment.

FIG. 4 is a side elevational view of the receptacle of said embodiment, the front dump position being shown in phantom.

FIG. 5 is a perspective view of the framework base upon which said receptacle is mounted in association with the dump direction control mechanism, lower portions of the receptacle frame shown in phantom for the purpose of illustration.

FIG. 6 is a view similar to FIG. 4 but showing the receptacle mounted upon the framework base.

Referring now more particularly to the drawings, the invention comprises a dump receptacle generally designated by the numeral 10. In the instant embodiment, receptacle 10 is a basket which may be of wire mesh construction and have an upper rigid frame 11 which defines an upper orifice 13, as illustrated in FIG. 2, into which articles such as fruit and the like may be introduced by a fruit picker or harvesting apparatus (not shown). The walls of the receptacle 10 are rigidified by a plurality of parallel spaced apart rigid corner-forming members 12 which extend normal to the frame 11 and define a plurality of receptacle sides the disposition of which is clearly shown in FIG. 2 and only sides 14, 15 and 16 of which have been particularly identified.

Between the corner-forming members 12 which define the sides 14, 15 and 16, the receptacle has a plurality of door or gate openings in which a plurality of doors or gates 17, 18 and 19 are pivotally mounted, respectively, in a manner which will be presently described. What are considered the opposite side doors or gates 17 and 18 are illustrated in closed and in open position in FIG. 1, and what is considered the front gate 19 is illustrated in closed and in open position in FIG. 4.

The receptacle comprises a floor 20 which is shown in phantom in FIG. 5. The peripheral portions of said floor are secured in a lower frame 21 which is disposed parallel to upper frame 11 and defines the lower corners of said receptacle 10, said frame 21 being rigidly secured to the lower end portions of the corner-forming members 12. As illustrated in phantom in FIG. 5, a pair of opposite elongated side rails 26 and 27 are secured to the underneath surface of floor 20 from which said rails extend downwardly within the frame 21.

As illustrated in FIGS. 5 and 6, the receptacle is supported on a mount or base support frame generally designated 22 and comprising a pair of opposite side rails 23 and 24, the forward end portions of which are rigidly secured to the opposite end portions of a front rail 25. As illustrated in FIG. 5, the rails 23 and 24 are disposed in operable alignment with rails 26 and 27, respectively, for a purpose which will become apparent presently.

At the corners of mount 22 which are formed at the juncture of the opposite side rails 23 and 24 with the front rail 25, there are rigidly secured a pair of upwardly opening tubular sections 28 and 29, respectively, which serve as ball sockets for a purpose which will become hereinafter apparent. As illustrated in FIGS 5 and 6, each of the opposite or rear end portions of the rails 23 and 24 carries an upwardly extending recessed plate or boss 31 which serves a purpose which will be described presently. The recessed plates or bosses 31 are disposed in transverse alignment with each other and spaced from the tube sections 28 and 29 longitudinally of rails 23 and 24, whereby there are provided four stations in rectangular disposition to support the receptacle 10, as illustrated in FIGS. 4 and 5.

The receptacle mount or support 22 is adapted to be rigidly secured to a tractor or the like. The embodiment which is illustrated is employed by connecting the receptacle mount 22 on the forward end of a conventional mobile fruit picker (not shown) in front of the operator's station over the traction wheels to provide good support for the weight of the articles to be carried in the receptacle 10. As illustrated clearly in FIGS. 2 and 5, the receptacle 10 extends from the mount 22 to provide a forward receptacle overhang 30 and a pair of oppositely extending side receptacle overhangs 32 and 33 by reason of which dumping from the front and from each of the sides of the receptacle 10 is facilitated, dumping to each side occurring by reason of rocking of the receptacle 10 about an axis parallel to a respective of the rails 23 and 24.

The upper portions or stems of a pair of ball members 34 and 35 are rigidly secured to the floor 20 of the receptacle 10 from which said ball members depend. As illustrated in FIG. 5, the ball portions of the ball members 34 and 35 are removably disposed in the tube sections 28 and 29 and thereby form ball joints to support the receptacle 10 at its forward end portion for rocking about an axis defined by such ball joints, as illustrated in phantom in FIG. 5.

A pair of receptacle-pivoting brackets 37, one of which is clearly seen in FIG. 6, depend from the normally rear end portions of rails 26 and 27. As illustrated in phantom in FIGS. 4 and 5, each bracket 37 comprises a pair of plates 38 and 39 which are spaced apart longitudinally of their respective of rails 26 and 27. Each pair of plates 38 and 39 is tied together by a pin 40 and adapted for disposition forwardly and rearwardly of a corresponding recessed plate 31. The recesses 42 of the plates 31 heretofore described open upwardly, as illustrated in FIG. 5, and said recesses 42 provide a pair of seats in which the pins 40, respectively, are adapted to engage, as illustrated in FIG. 6. When the receptacle 10 is in receiving disposition, that is, not in dump position, each of the plates 31 will be disposed medially of a corresponding pair of bracket plates 38 and 39 with its pin 40 engaging in a respective recess 42.

The aforedescribed construction enables the receptacle 10 to be rocked to a dump position toward either side, as illustrated in phantom in FIG. 1, with a right axis of rotation during clockwise movement of the receptacle being provided by the right pin 40 and the ball 35, and the left axis of rotation being provided by the left pin 40 and the ball 34. Inasmuch as the instant embodiment is adapted to be mounted in a manner such that dumping from the rear is not intended, no axis of rotation is provided for rocking the receptacle in a direction opposite to the phantom position of such receptacle shown in FIG. 4.

The provision for controlling the receptacle to enable selective dumping to the left and to the right, as illustrated in phantom in FIG. 1, and to the front, as illustrated in phantom in FIG. 4, comprises a dump direction control or latching mechanism clearly seen in FIGS. 3 and 5 and generally designated by the numeral 43. The latching mechanism is adapted to be manually controlled, and comprises a block or mount 44 which is adapted for rigid securance to the body or framework of the vehicle in connection with which the receptacle 10 is employed.

One end portion (not shown) of a latch control shaft 45 is journalled in said mount 44. The opposite end portion 41 of shaft 45 is journalled in a boss 62 which is suspended from rail 25, as illustrated in FIG. 5. A control rod 46, having a handle 47 adapted to be disposed adjacent an operator of the vehicle in connection with which the receptacle 10 is used, is rigidly secured to said shaft 45. The control rod 46 projects radially from shaft 45 through a gate plate 48 which is carried on mount 44, said gate plate preferably being slotted, as illustrated in FIGS. 3 and 5, to define the course of the control rod 46. The shaft 45 is disposed below the receptacle 10 and the supporting mount rails 23 and 24 medially of which said shaft 45 is disposed and longitudinally of and parallel to which said shaft 45 extends, as illustrated in FIG. 2. A pair of flat links 50 and 51, as illustrated in FIGS. 3 and 5, are rigidly secured to the shaft 45 in spaced apart relationship longitudinally thereof for rotation therewith.

Extending outwardly from opposite sides of the link 50 are a pair of latch rods 52 and 53, the adjacent end portions of which are pivotally connected to the link 50 by means of a pair of yoke connectors 54, respectively. The outer end portions of the latch rods 52 and 53 are pivotally connected to the lower end portions of a pair of opposed latches 55, respectively, by means of yoke connectors 56, as clearly illustrated in FIGS. 3 and 5. The latches 55 are aligned with each other transversely of the latch control shaft 45, and are adapted for disposition adjacent the brackets 37 with which said latches are alignable for a purpose which will become presently apparent. The rails 23 and 24 of mount 22 carry a pair of bosses 57, respectively, aligned transversely of the shaft 45, only one of said bosses 57 being seen in FIGS. 5 and 6. The bosses 57 define anchoring plates by means of which the latches 55 are connected to the mount 22, such connections of the latches 55 to the bosses 57 being pivotal, as indicated at 58.

A pair of latch rods 59 and 60, which are aligned with each other transversely of the latch control shaft 45, extend outwardly from opposite sides of the link 51 to which the inner end portions of said latch rods 59 and 60 are pivotally connected by means of a pair of yoke connectors 61, as illustrated in FIGS. 3 and 5. As illustrated in FIGS. 3, 5 and 6, by means of a pair of yoke-type connectors 64, the outer end portions of the latch rods 59 and 60 are pivotally connected to the lower end portions of a pair of opposed latches 63 which are aligned with each other transversely of shaft 45. The rails 23 and 24 of mount 22 carry a pair of bosses 66, respectively, only one of which is seen in FIGS. 5 and 6. Bosses 66 define anchoring plates by means of which the latches 63 are pivotally secured to the mount 22, as illustrated in FIGS. 3, 5 and 6, at 65.

The jaws or hooks 36 of the latches 55 are adapted to be rocked into and out of engagement with the pins 40, respectively, whereby the receptable 10 can be releasably retained by said latches 55. Similarly, the jaws or hooks 49 of latches 63 are adapted to releasably engage a pair of opposed eyelets or U-shaped anchoring members 67, such eyelets or anchoring members 67 being connected in aligned positions to the front end portion of base 20 from which said eyelets or U-shaped members 67 depend in a manner as seen in FIGS. 4, 5 and 6. Thereby, the receptacle 10 is additionally releasably retained.

The manner in which the latching mechanism 43 operates is as follows: Rocking the control rod 46 in the central slot 68 in the gate plate 48 will cause the latch control shaft 45 to rock correspondingly about its longitudinal axis. The device may be constructed, as in the instant embodiment, in a manner such that when the control rod 46 is centered in slot 68, substantially as illustrated in FIGS. 3 and 5, all of the latches 55 and 63 are disengaged and the receptacle 10 is relatively free, as in FIG. 1.

Upon rocking of the control rod 46 to the right, or clockwise with respect to FIGS. 3 and 5, the jaws 36 and 49 of latches 55 and 63 on the right will rock counterclockwise to lock or engage a corresponding rod 42 and eyelet 67 to lock the right side of the frame. Such effect results from extension to the right of latch rods 53 and 60 which will cause the right latches 55 and 63 to rock counterclockwise with respect to FIG. 1 about right pivots 58 and 65, respectively. Simultaneously, the latch rods 52 and 59 will move to the right with respect to FIG. 1. Accordingly, the jaws 36 and 49 of latches 55 and 63 on the left of the receptacle will rock counterclockwise to disengage the left pin 40 and eyelet 67.

By moving the control lever 46 in the slot 68 to the left with respect to FIGS. 3 and 5, the control shaft 45 will rock counterclockwise, and, accordingly, the latches 55 and 63 on the left side of the receptacle when viewed from FIGS. 1, 4 and 5 will be rocked clockwise into receptacle-locking position by engaging the left pin 42 and the left eyelet 67, while the latches 55 and 63 on the right side of the vehicle will rock clockwise to receptacle-release position.

As best illustrated in FIGS. 1 and 2, rocking or tilting of the receptacle 10 is controlled by a pneumatic or hydraulic mechanism generally designated 69. The pneumatic mechanism comprises a cylinder 70 suitably mounted adjacent the receptacle 10; a pressure actuated receptacle control rod 71 is reciprocatively mounted in the cylinder 70, and at its upper end portion said rod 71 is connected to the upper medial portion of a downwardly extending bale 72 the lower opposite end portions of which are connected to the rear parts of lower member 21, as illustrated at 73 in FIG. 1. A link 68 which connects rod 71 to the bale 72 has a tubular portion 74 in which the upper medial portion of the bale is journalled to permit forward dumping of the receptacle 10. Furthermore, said link 68 is pivotally connected to the upper end portion of said rod 71 by means of a pin 75 which extends parallel to the sides of the receptacle 10 and transversely of tubular portion 74, whereby rocking of the receptacle from side to side may be achieved.

Reciprocation of the rod 71 is controlled in a conventional manner by fluid which flows into and out of the cylinder 70 through fluid conduits 91. The fluid flow is controlled by a valve means (not shown) operated by the latch control rod 46. That is to say, the latch control rod 46 is also a pneumatic or hydraulic valve control. By referring to FIGS. 2, 3 and 5, it is seen that a plurality of slots 76, 77 and 78 are formed in the gate plate 48 transversely of the center slot 68. While construction of the valve control mechanism is not critical to the instant invention, in the illustrated embodiment, when the control rod 46 is moved in the slots 76, 77 and 78 toward the front 16 of the receptacle, or toward front rail 25, the rod 71 will be extended or projected from the cylinder 70, whereas upon movement of the latch control rod 46 in an opposite direction, the rod 71 will withdraw into the cylinder 70.

Merely by latch control and reciprocation of rod 71, rocking of the receptacle 10 to the two positions shown in phantom lines in FIG. 1 from the solid line position, and to the phantom line position shown in FIG. 4 from the solid line position, is possible. The various dump positions are achieved in the following manner: For example, assume it is desired to dump to the right with respect to FIG. 1. In such event, the left latches 55 and 63 are released from and the right latches 55 and 63 are engaged with respective pins 40 and eyelets 67 by rocking the rod 46 in the slot 68 to the position of slot 78. Thereafter, the rod 46 is moved in the slot 78 forwardly, whereupon the rod 71 will extend. Because the right latches 55 and 63 are holding the receptacle on the right side, the receptacle will be rocked about an axis comprising the right pin 40 and the ball 35 upon extension of the rod 71. When it is desired to return the receptacle 10 to the solid line position shown in FIG. 1, the latch control rod need merely be shifted in the slot 78 to the slot 68, whereupon the rod 71 will withdraw or recede into cylinder 70. From the foregoing description relative to dumping to the right, the procedure for dumping to the left with respect to FIG. 1 is now also understood and, accordingly, will not be described further. However, when it is desired to dump forward, the rod 46 is moved to the neutral position, that is, positioned in slot 68 to its intersection with the slot 77. In such position, as previously indicated, all latches are disengaged. Thereupon, the receptacle 10 is supported on the balls 34 and 35 which are seated in tube sections 28 and 29 at the front end portion of said receptacle and on the pins 40 at the rear end portion of said receptacle. By then moving the rod 46 forwardly in the slot 77, the rod 71 will extend and the receptacle 10 will rock on balls 34 and 35 about a thereby defined axis.

As the receptacle 10 is rocked to the right with respect to FIG. 1, the door 18 will open to allow voiding the receptacle of its contents. As said receptacle is rocked to the left, the door 17 will open to permit voiding of the receptacle through that door. Also, as the receptacle is rocked forwardly, the door 19 will open to permit therethrough voiding or emptying of the receptacle.

To the end that the doors 17, 18 and 19 are managed automatically and in an orderly fashion, a door control mechanism is associated with each door. In the present embodiment, each door control mechanism is the same as the other, and, accordingly, only one will be described. As illustrated in the drawings, the lower end portion of each of the doors is pivotally connected to the lower receptacle frame 21 by means including a hinge 79. As illustrated in phantom in the drawings, each of the doors may have a pair of opposed arcuate side flanges 80 which serve as retainers or bosses, which not only facilitate opening and closing of respective doors but also act as chutes or guides for the contents when such doors are in extended or dump position. To facilitate the automatic control of the doors 17, 18 and 19, a cam structure 81 is mounted adjacent each of said doors 17, 18 and 19, said cam structures having depending flanges 82, respectively, which are rigidly secured to the rails 23, 24 and 25 of the receptacle mounts 22, as illustrated in FIG. 5.

Each cam structure has a rounded nose portion 84 which extends outwardly from its respective rail, and, as illustrated in FIGS. 1, 4 and 6, the rounded cam noses 84 are directed slightly downwardly. Each of said cam noses 84 is engaged by a cam follower 85 by means of which opening and closing of the doors or gates 17, 18 and 19 is controlled. For such purpose, each of the doors 17, 18 and 19 has rigidly secured thereto or carries an arm 86 which extends slightly inwardly beneath the receptacle 10. The forward arm 86 and one side arm are illustrated clearly in FIG. 6. By means of a pin 87, each cam follower 85 is journalled in the lower end portion of its respective arm 86.

Thereby, as the receptacle 10 is rocked to each dump position, a corresponding of the doors will be permitted to open. As the receptacle is returned from each dump position, a corresponding door will be forced closed as its associated cam follower 85 is carried about its cam nose 84.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A dump construction comprising a receptacle having a plurality of dump sides and an end between said sides; a mount for said receptacle; a plurality of depending supports secured to said receptacle and disengageably seated on said mount, said supports arranged in parallel pairs spaced apart longitudinally of a pair of said sides; receptacle-anchoring members connected to said receptacle and disposed in alignment with said supports; latch members mounted in pairs for releasable locking engagement with selected ones of pairs of said anchoring members; latch operating means for locking selected ones of said latch members with corresponding anchoring members, and a single retractable projector disposed alongside said end and connected to part of said receptacle offset from its medial portion between said sides and said end and upon extension of which said receptacle is tilted toward a latch member held side, and including a bail looped over said projector and having a bight portion pivotally connected thereto and having legs connected to said receptacle.

2. A dump construction as defined in claim 1 in which one support of each parallel pair defines with the other thereof an axis of rotation normal to the parallel pairs of supports, said latches mounted for simultaneous disengagement of all of said anchoring members, whereupon extension of said projector said receptacle becomes tilted about said axis of rotation.

3. A dump structure as defined in claim 1 in which said latch selector means comprises an elongated latch control shaft rockably mounted about its longitudinal axis and disposed medially of said pairs of latch members; a latch control rod connected to each latch member and said latch control shaft, and fixed pivots for said latch members disposed adjacent said anchoring members when seated, whereupon rocking of said latch control shaft in each direction the latch members are alternately pivoted to anchoring and receptacle-release positions.

4. A dump structure as defined in claim 1 in which said latch members are arranged in spaced apart parallel pairs and pivotally connected to said mount, said latch-operating means comprising an elongated operable latch control shaft extending longitudinally of said parallel pairs of latch members medially thereof; a rod having opposite end portions pivotally connected to each latch and said latch control shaft, and means for rocking said latch control shaft in alternate directions to first secure said receptacle to said mount on one side and release an opposite side and then release such one side and secure the opposite thereof.

5. A dump structure as defined in claim 4 further characterized by a pair of flat links secured to said latch control shaft in spaced apart relationship longitudinally thereof, the latch rods arranged in pairs extending transversely of said latch control shaft, the inner portions of each pair of latch rods pivotally connected to a corresponding link, whereby as one parallel pair of latch members is disposed in receptacle-secure position the other pair of parallel latch members is disposed in receptacle-release position.

6. The dump receptacle of claim 1 wherein a dump door is mounted in at least one of said sides and having a bottom portion pivotally connected to said receptacle, and cam means controlling the operation of said door as the receptacle is rocked into and out of dump positions.

7. A dump receptacle as defined in claim 6 in which the cam means comprises a rounded cam projection mounted in fixed position below said door, and a rotatable cam follower carried by said door and engaging the cam projection, whereupon rocking of said receptacle into dump and rest positions the door is opened and forced closed.

8. A dump structure comprising a receptacle mount characterized by a pair of parallel side rails; a pair of receptacle seat members spaced longitudinally of each of said side rails; a receptacle depending support rockably engaging in each of said seats, respectively, said receptacle having a plurality of sides overhanging said rails and having a pair of ends; a dump door mounted in each side; a plurality of anchoring members depending from said receptacle and disposed adjacent said supports, respectively; a latch pivoted on said receptacle mount adjacent each seat member; a latch control shaft disposed medially of and extending parallel to said side rails; latch link members connected to said latch control shaft and rockably connected to said latches; means for alternately rocking said shaft alternately to cause a pair of latches to engage and disengage a pair of anchoring members to releasably secure said receptacle in said seat members on one side while alternately disengaging and engaging an opposite pair of anchoring members to securably free said receptacle on an opposite side, and single retractable projector member means secured to said receptacle mount to rock the same about an axis provided by said supports when locked by said latches and an inverted U-shaped element having a pair of legs secured at their lower ends to one end of said receptacle generally medially between said sides and offset inwardly of one end of the receptacle and said element having an upper portion interconnecting said legs and receptacle and said element having an upper portion interconnecting said legs and pivotally connected with said projector member and disposed outwardly alongside the adjacent end of the receptacle.

References Cited

UNITED STATES PATENTS

| | | | |
|---|---|---|---|
| 1,711,299 | 4/1929 | Wood | 298—17.7 |
| 1,909,341 | 5/1933 | Galanot. | |
| 2,023,700 | 12/1935 | Rodler | 298—17.6 |
| 2,032,840 | 3/1936 | Flowers | 298—17.7 |
| 2,072,998 | 3/1937 | Allin | 298—23 X |
| 2,168,298 | 8/1939 | Galanot | 298—17.7 |
| 2,360,456 | 10/1944 | Weierbach | 298—17.6 |
| 2,856,232 | 10/1958 | Mentes | 298—17.7 |
| 3,240,164 | 3/1966 | Flowers | 298—18 X |

BENJAMIN HERSH, *Primary Examiner.*

R. J. JOHNSON, *Examiner.*